(12) United States Patent
Ishizaka et al.

(10) Patent No.: US 12,377,807 B2
(45) Date of Patent: Aug. 5, 2025

(54) INSTALLATION STRUCTURE

(71) Applicant: Honda Motor Co., Ltd., Tokyo (JP)

(72) Inventors: Keita Ishizaka, Tokyo (JP); Makoto Noda, Tokyo (JP); Tomohiro Takahashi, Tokyo (JP); Daiki Nakatsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/594,015

(22) Filed: Mar. 4, 2024

(65) Prior Publication Data

US 2025/0001964 A1  Jan. 2, 2025

(30) Foreign Application Priority Data

Jun. 28, 2023  (CN) .......................... 202310772930.8

(51) Int. Cl.
*B60R 21/20* (2011.01)
(52) U.S. Cl.
CPC .................................... *B60R 21/20* (2013.01)
(58) Field of Classification Search
CPC ............................. B60R 21/20; B60R 13/0206
See application file for complete search history.

(56) References Cited

U.S. PATENT DOCUMENTS 6,394,695 B1 * 5/2002 Chausset ................. F16B 5/065
403/397

FOREIGN PATENT DOCUMENTS

| JP | 3546014 | | 7/2004 |
| JP | 2006118679 | A * | 5/2006 |
| JP | 5149597 | | 2/2013 |

OTHER PUBLICATIONS

Kuroda et al. JP 2006-118679 Machine English translation, ip.com (Year: 2006).*

* cited by examiner

*Primary Examiner* — Karen Beck

(74) *Attorney, Agent, or Firm* — JCIPRNET

(57) ABSTRACT

An installation structure includes: an air bag, disposed on an indoor side of a vehicle body; an interior, covering the air bag; and a fastener, connected with the interior and installed to the vehicle body. The fastener includes a vehicle body side component installed to the vehicle body and an interior side component installed to the interior. One of the vehicle body side component and the interior side component includes a male part. The other includes a female part engaged with the male part and including: a first wall, extending in an insertion direction where the fastener is inserted into the vehicle body; a second wall, parallel to the first wall; and an engagement part, provided on the first wall and engaged with the male part. When the male and female parts are engaged, a space is formed adjacent to the male part and between the first and second walls.

3 Claims, 4 Drawing Sheets

INSTALLATION STRUCTURE

CROSS-REFERENCE TO RELATED APPLICATION

This application claims the priority benefit of China application no. 202310772930.8, filed on Jun. 28, 2023. The entirety of the above-mentioned patent application is hereby incorporated by reference herein and made a part of this specification.

BACKGROUND

Technical Field

The invention relates to an installation structure.

Description of Related Art

In conventional vehicles, airbags are one of the means to protect the safety of passengers in the event of a serious vehicle collision. Since airbags are installed between the interior and the vehicle body, after an external impact, the airbag needs to be quickly inflated and ejected by pushing open the interior. However, with the conventional installation structure, it is still possible that the air bag is unable to be released smoothly, thus leaving room for further efforts. The invention aims to improve safety and contribute to the development of a sustainable transportation system.

SUMMARY

An installation structure according to an aspect of the invention includes: an air bag, disposed on an indoor side of a vehicle body; an interior, covering the air bag; and a fastener, connected with the interior and installed to the vehicle body. The fastener includes a vehicle body side component installed to the vehicle body and an interior side component installed to the interior. One of the vehicle body side component and the interior side component is provided with a male part, and an other of the vehicle body side component and the interior side component is provided with a female part engaged with the male part. The female part includes: a first wall, extending in an insertion direction where the fastener is inserted into the vehicle body; a second wall, parallel to the first wall; and an engagement part, provided on the first wall and engaged with the male part. In a state in which the male part is engaged with the female part, a space part is formed at a position adjacent to the male part and between the first wall and the second wall.

DESCRIPTION OF THE EMBODIMENTS

Figure 1:
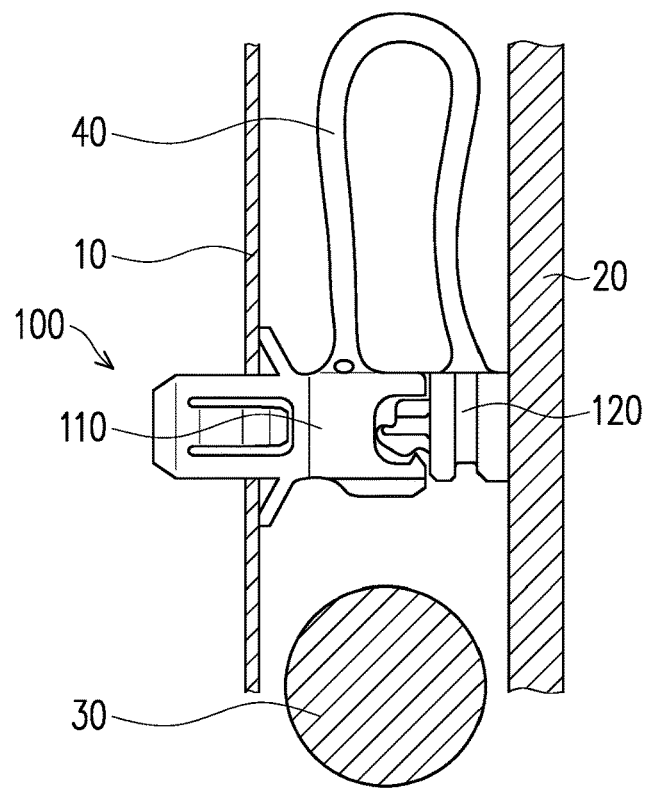
FIG. 1 is a schematic view illustrating an installation structure according to an embodiment of the invention.

The invention provides an installation structure that can be released and expanded smoothly.

An installation structure according to an aspect of the invention includes: an air bag, disposed on an indoor side of a vehicle body; an interior, covering the air bag; and a fastener, connected with the interior and installed to the vehicle body. The fastener includes a vehicle body side component installed to the vehicle body and an interior side component installed to the interior. One of the vehicle body side component and the interior side component is provided with a male part, and an other of the vehicle body side component and the interior side component is provided with a female part engaged with the male part. The female part includes: a first wall, extending in an insertion direction where the fastener is inserted into the vehicle body; a second wall, parallel to the first wall; and an engagement part, provided on the first wall and engaged with the male part. In a state in which the male part is engaged with the female part, a space part is formed at a position adjacent to the male part and between the first wall and the second wall.

According to an embodiment of the invention, a first direction is defined as a direction in which the first wall and the second wall face each other, and the first wall comprises a pressing part, and the pressing part presses against the interior side component in a second direction perpendicular to the first direction, and the pressing part includes a first inclined part, and the first inclined part is inclined in a direction toward an outer side of the second direction and away from the interior side component.

According to an embodiment of the invention, the male part includes an engaged part to be engaged with the engagement part of the female part, a first direction is defined as a direction in which the first wall and the second wall face each other, and the engagement part comprises an inclined part, the inclined part is inclined in a direction toward an outer side of a second direction perpendicular to the first direction and away from the engagement part.

According to an embodiment of the invention, an upper part of the second wall is pressed against the one of the vehicle body side component and the interior side component where the male part is provided, a first direction is defined as a direction in which the first wall and the second wall face each other, and the upper part of the second wall comprises a second inclined part, the second inclined part is inclined in a direction toward an outer side of a second direction perpendicular to the first direction and away from the one of the vehicle body side component and the interior side component where the male part is provided.

According to an embodiment of the invention, the installation structure further includes: a strap, connected with the vehicle body or the vehicle body side component and the interior or the interior side component. The strap is connected with the second wall.

Based on the above, in the installation structure of the embodiment, when the male part and the female part are engaged, an accommodation space of the female part, i.e., a gap portion (the space part), is defined between the first wall and the second wall. In this way, when rotated by a force in the rotation direction, the interior side component (the interior) is able to be released from the vehicle body side component (the vehicle body) without obstruction. Accordingly, the installation structure according to the embodiments of the invention can be released and expanded smoothly.

Figure 2:
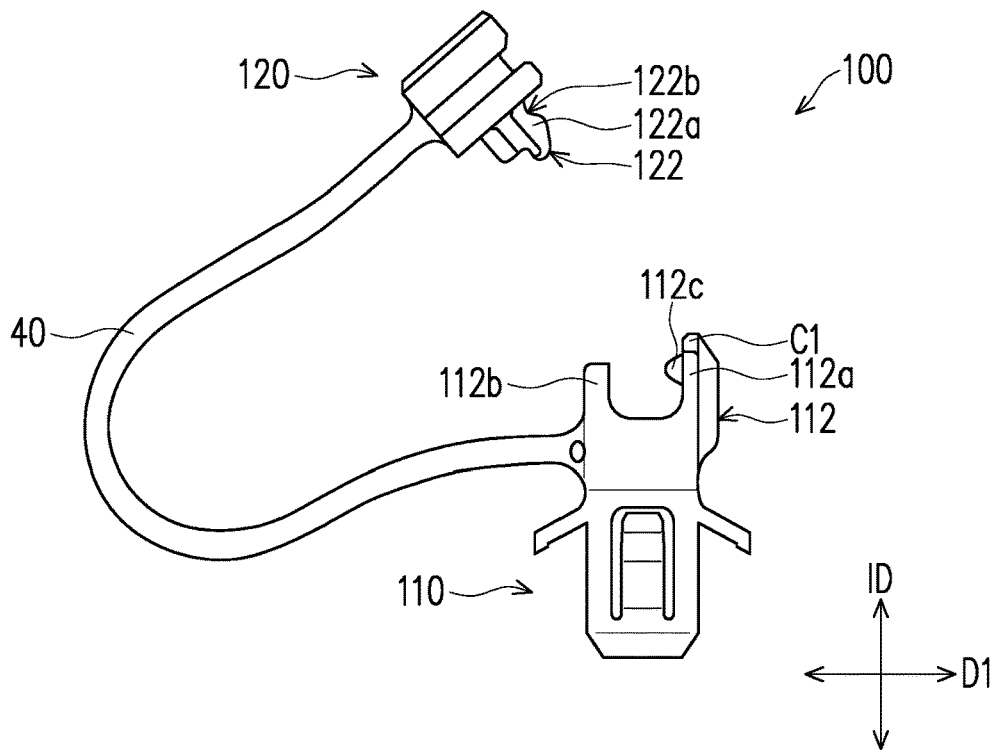
FIG. 2 is a schematic view illustrating a fastener of the installation structure according to the embodiment.
Figure 3A:
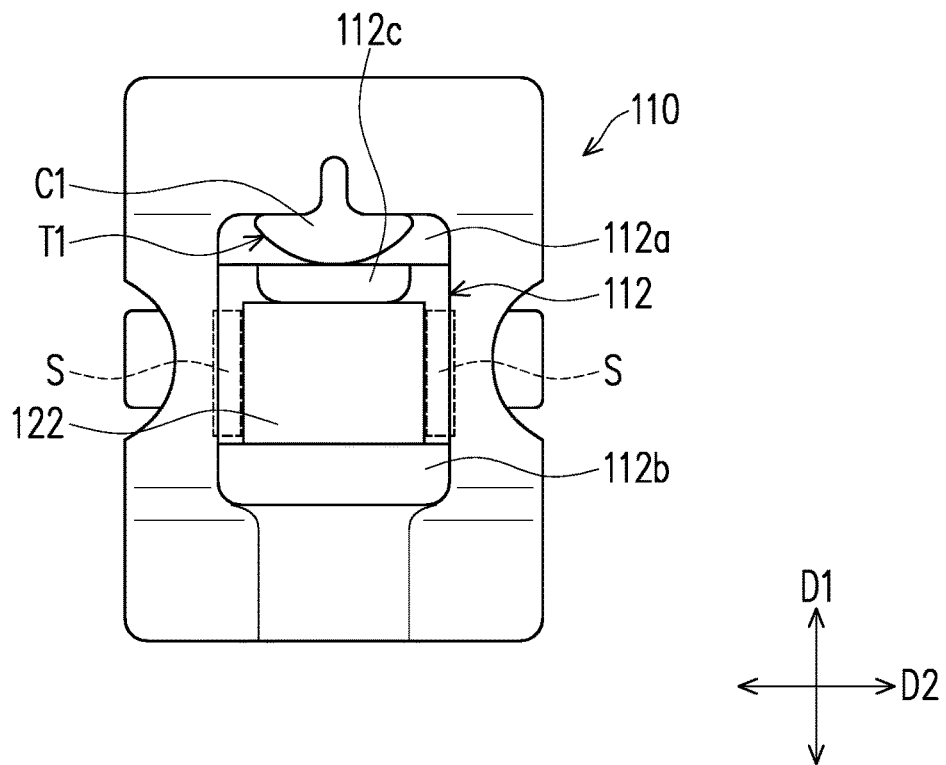
FIG. 3A is a partial schematic view illustrating a state in which a male part and a female part of the fastener of the embodiment are engaged.
Figure 3B:
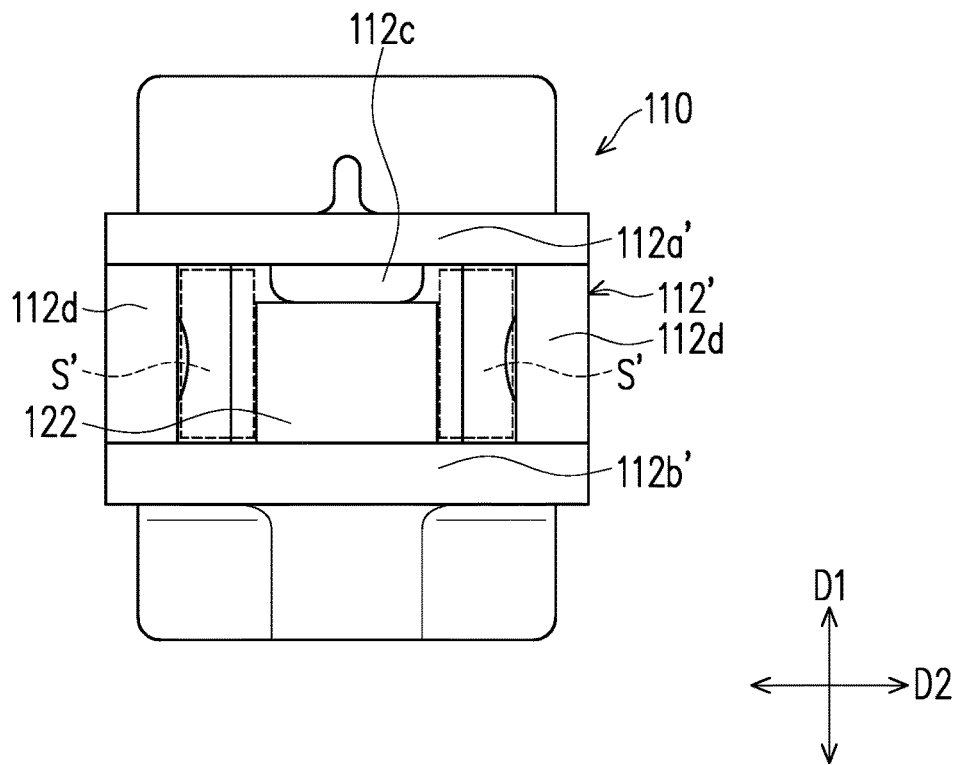
FIGS. 3B to 3D are modified examples of FIG. 3A.
Figure 3C:
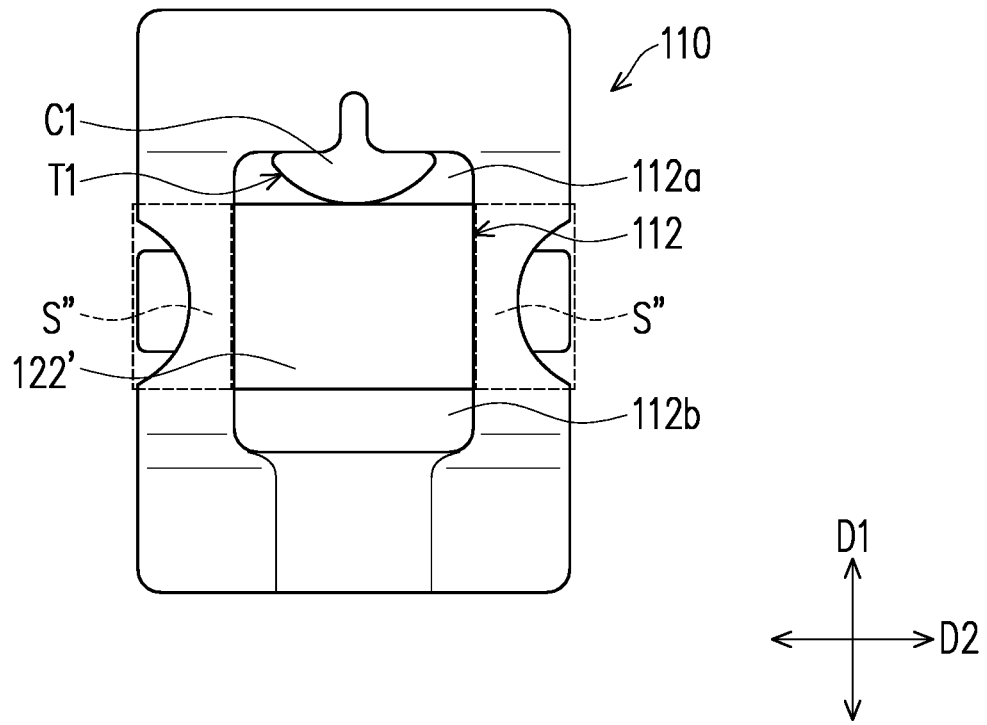
Figure 3D:
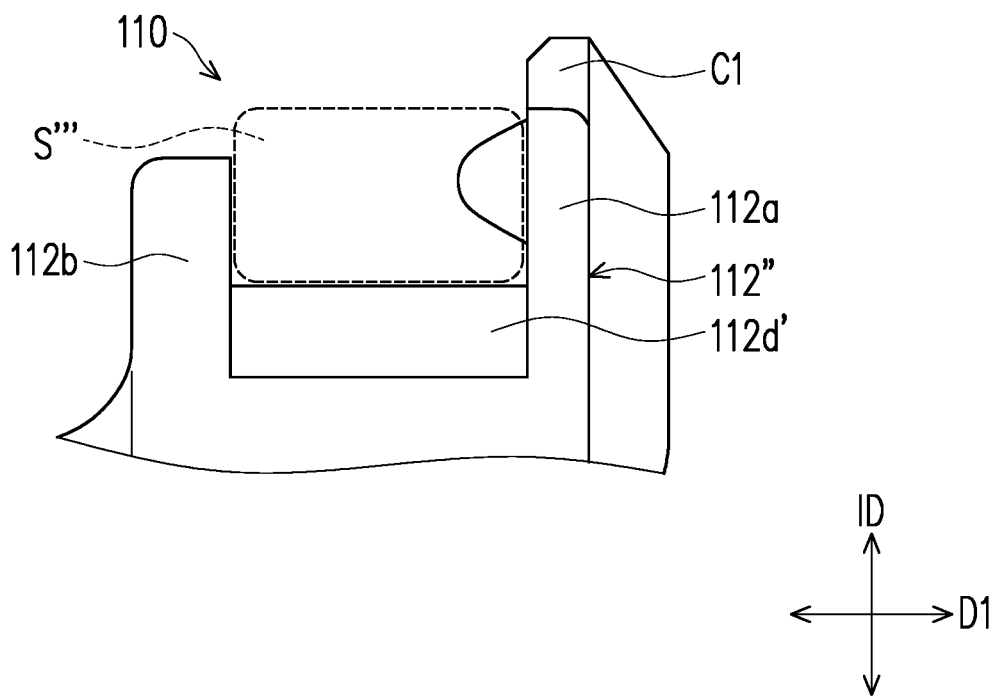
Figure 4:
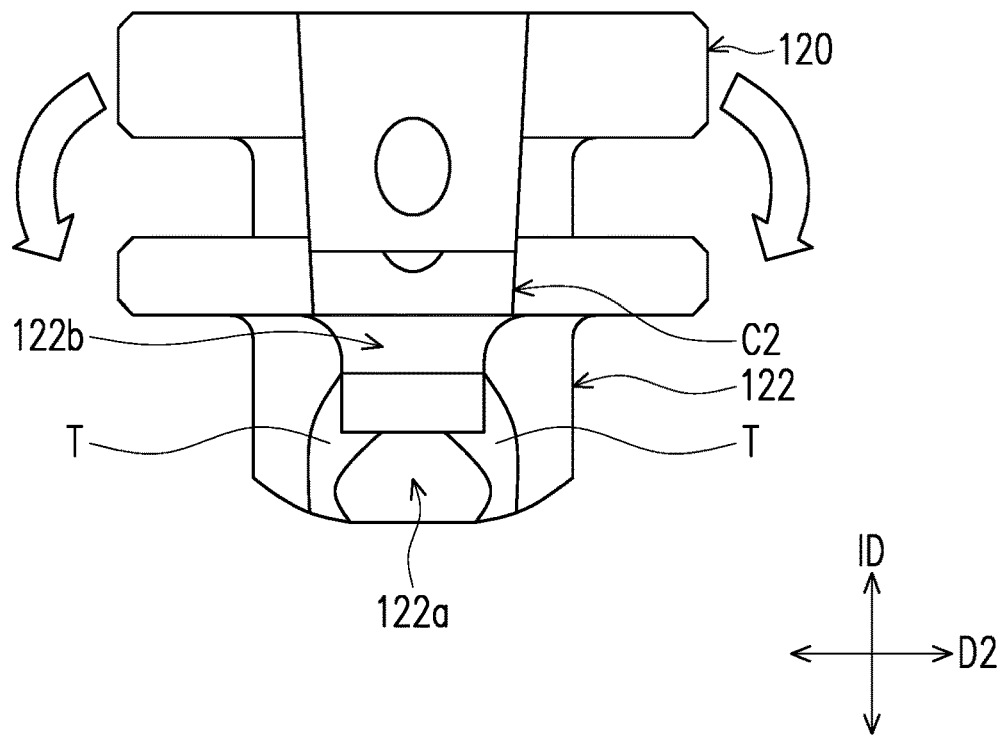
FIG. 4 is a schematic view illustrating an interior side component of the fastener of the embodiment.
Figure 5:
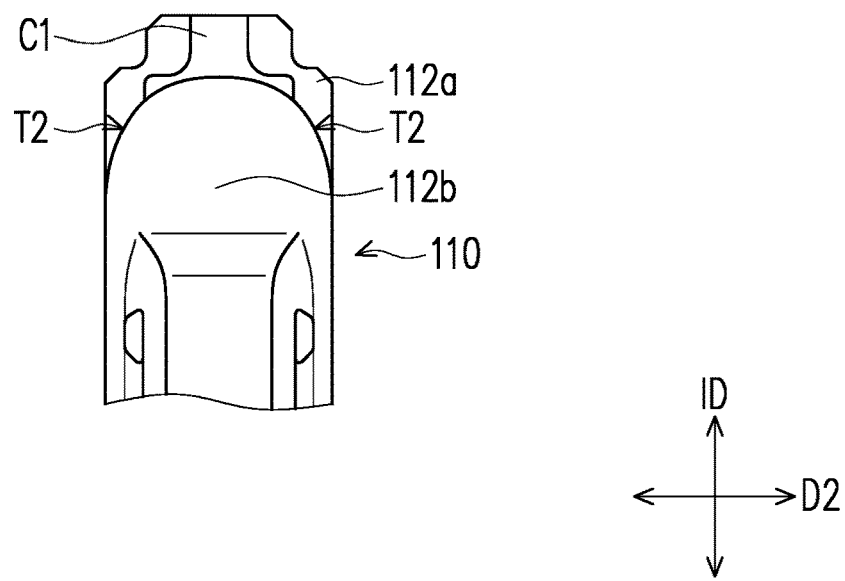
FIG. 5 is a schematic view illustrating a vehicle body side component of the fastener of the embodiment from another perspective.

FIG. 1 is a schematic view illustrating an installation structure according to an embodiment of the invention. FIG. 2 is a schematic view illustrating a fastener of the installation structure according to the embodiment. FIG. 3A is a partial schematic view illustrating a state in which a male part and a female part of the fastener of the embodiment are engaged. FIGS. 3B to 3D are modified examples of FIG. 3A. FIG. 4 is a schematic view illustrating an interior side component of the fastener of the embodiment. FIG. 5 is a schematic view illustrating a vehicle body side component of the fastener of the embodiment from another perspective. In the embodiment, an installation structure 1 is, for example, a structure applied to install a vehicle body 10 and an interior 20 in a vehicle. An airbag 30, for example, is disposed on the indoor side of the vehicle body 10, and the interior 20 covers the airbag 30. In other embodiments not shown herein, the installation structure 1 may also be applied to other interior/exterior structures that need to be expanded. The invention does not intend to impose a limitation on this regard. In addition, unless otherwise specified, like or similar reference symbols represent like or similar parts in the accompanying drawings and descriptions. In the following, the installation structure 1 of the embodiment will be described in detail with reference to FIGS. 1 to 5.

Referring to FIGS. 1 to 4, in the embodiment, the installation structure 1 includes a fastener 100. The fastener 100 is connected with the interior 20 to be installed to the vehicle body 10. The fastener 100 is, for example, fixed by being inserted into the vehicle body 10 in an insertion direction ID. However, the fastener 100 may also installed in other ways as appropriate. That is, the invention does not intend to impose a specific limitation on this regard. The fastener 100 includes a vehicle body side component 110 installed to the vehicle body 10 and an interior side component 120 installed to the interior 20. In addition, the vehicle body side component 110 and the interior side component 120 form structures that can be engaged with each other. Specifically, one of the vehicle body side component 110 and the interior side component 120 is provided with a male part 122, and the other of the vehicle body side component 110 and the interior side component 120 is provided with a female part 112 to be engaged with the male part 122. In addition, the male part 122 and the female part 112 are disposed to face each other in the insertion direction ID. For example, in the embodiment, the interior side component 120 is provided with the male part 122, and the vehicle body side component 110 is provided with the female part 112. However, such arrangement is interchangeable, e.g., the interior side component may be provided with the female part, whereas the vehicle body side component may be provided with the male part. The invention does not intend to impose a limitation on this regard. The female part 112 includes a first wall 112a, a second wall 112b, and an engagement part 112c. The first wall 112a extends along the insertion direction ID in which the fastener 100 is inserted into the vehicle body 10. The second wall 112b is parallel to the first wall 112a and extends along the insertion direction ID. In other words, a space for accommodating the male part 122 is formed between the first wall 112a and the second wall 112b. In addition, the engagement part 112c is provided on the first wall 112a to be engaged with the male part 122. In a state where the male part 122 is engaged with the female part 112 (such as the state shown in FIGS. 1 and 3), a space part S is formed at a position adjacent to the male part 122 and between the first wall 112a and the second wall 112b.

Thus, in the installation structure 1 of the embodiment, when the male part 122 and the female part 112 are engaged, an accommodation space of the female part 112, i.e., a gap portion (the space part S), is defined between the first wall 112a and the second wall 112b. In this way, when rotated by a force in a rotation direction, the interior side component 120 (the interior 20) is able to be released from the vehicle body side component 110 (the vehicle body 10) without obstruction. Accordingly, the installation structure 1 of the embodiment can be released and expanded smoothly.

More specifically, various modified examples may also be available with regard to the engagement of the male part 122 with the female part 112. Referring to FIG. 3B, in a first modified example, a female part 112' further includes a sidewall 112d. The sidewall 112d extends along a direction in which a first wall 112a' and a second wall 112b' face each other, i.e., a first direction D1. That is, the sidewall 112d is formed between the first wall 112a' and the second wall 112b'. In addition, the first wall 112a' and the second wall 112b' are formed to be longer than the first wall 112a and the second wall 112b in a second direction D2 perpendicular to the first direction D1. Thus, in a state where the male part 122 is engaged with the female part 112' (as shown in FIG. 3B), a space part S' is formed at a position between the first wall 112a and the second wall 112b' and between the male part 122 and the sidewall 112d.

Referring to FIG. 3C, in a second modified example, the length of a male part 122' in the second direction D2 is formed to be the same as the first wall 112a and the second wall 112b. Therefore, in a state where the male part 122' is engaged with the female part 112 (as shown in FIG. 3C), a space part S'' is formed between the first wall 112a and the second wall 112b and on two outer sides of the male part 122' in the second direction D2.

Referring to FIG. 3D, a third modified example is similar to the structure of the first modified example, but differs in that a height of a sidewall 112d' is formed to be smaller in the insertion direction ID. Therefore, in a state where the male part 122 is engaged with a female part 112'' (as shown in FIG. 3D), a space part S''' is formed between the first wall 112a and the second wall 112b and above the sidewall 112d' in the insertion direction ID.

Referring to FIG. 3A again, in the embodiment, the first wall 112a includes a pressing part C1. The pressing part C1 presses against a pressed part C2 (as shown in FIG. 4) of the interior side component 120 in the second direction D2 perpendicular to the first direction D1. The pressing part C1 includes a first inclined part T1, and the first inclined part T1 is inclined relative to the second direction D2. More specifically, the first inclined part T1 is inclined in a direction toward the outer side of the second direction D2 and away from the interior side component 120 in the first direction D1. The first inclined part T1 may be formed with a curved surface. However, the invention is not limited thereto. Therefore, from the perspective of the insertion direction ID, the pressing part C1 is formed in an arc shape. However, the invention is not limited thereto. The pressing part C1 may also be in other shapes as appropriate. According to such arrangement, in correspondence with the acting of a relative movement of the interior side component 120 from the vehicle body side component 110, the pressing part C1 is provided to allow the first wall 112a to move away from the interior side component 120 to remove the engagement of the engagement part 112c to the interior side component 120. Accordingly, the interior side component 120 is able to be smoothly detached from the vehicle body side component 110.

Referring to FIGS. 2 and 4, in the embodiment, the male part 122 includes an engaged part 122a and a groove 122b.

The engaged part 122a is formed in a convex shape convex toward the first direction D1, and the groove 122b is formed above the engaged part 122a in the insertion direction ID, so as to be engaged with the engagement part 112c of the female part 112. The engaged part 122a includes an inclined part T. The inclined part T is inclined in a direction toward the outer side of the second direction D2 perpendicular to the first direction D1 and away from the engagement part 112c (i.e., a direction where the first wall 112a faces the second wall 112b in the second direction D2). The inclined part T may be formed in a curved surface. However, the invention is not limited thereto. According to such arrangement, in correspondence with the acting of a relative movement of the interior side component 120 from the vehicle body side component 110, the inclined part T is provided to reduce the obstruction received when the interior side component 120 rotates, thereby allowing the interior side component 120 to be smoothly detached from the vehicle body side component 110.

Referring to FIG. 5, in the embodiment, the upper part of the second wall 112b is pressed against the component (the interior side component 120) where the male part 122 is disposed. The upper part of the second wall 112b includes a second inclined part T2. The second inclined part T2 is inclined in a direction toward the outer side of the second direction D2 perpendicular to the first direction D1 and away from the component where the male part 122 is provided (the interior side component 120), that is, the lower side of the insertion direction ID. According to such arrangement, in correspondence with the acting of a relative movement of the interior side component 120 from the vehicle body side component 110, the second inclined part T2 is provided to reduce the obstruction when the interior side component 120 rotates, thereby allowing the interior side component 120 to be smoothly detached from the vehicle body side component 110.

Moreover, in the embodiment, the installation structure 1 further includes a strap 40. The strap 40 connects the vehicle body side component 110 and the interior side component 120, and an end of the strap 40 is connected with the second wall 112b of the female part 112. In this way, the interior side component 120 can be detached smoothly without obstructing the movement of the first wall 112a provided with the engagement part 112c and the space S. In other embodiments not shown herein, the strap 40 may also be directly connected with the vehicle body 10 and the interior 20, and is not limited to being connected with the fastener 100. For example, the strap 40 may also be connected with various combinations of components, such as the vehicle body 10 and the interior side component 120, the vehicle side component 110 and the interior 20, or the vehicle body 10 and the interior 20.

In view of the foregoing, in the installation structure of the embodiment, when the male part and the female part are engaged, an accommodation space of the female part, i.e., a gap portion (the space part), is defined between the first wall and the second wall. In this way, when rotated by a force in the rotation direction, the interior side component (the interior) is able to be released from the vehicle body side component (the vehicle body) without obstruction. In addition, the first wall includes the pressing part, and the pressing part includes the first inclined part. With such arrangement, in correspondence with the acting of the relative movement of the interior side component from the vehicle body side component, the pressing part is provided to allow the first wall to move away from the interior side component to remove the engagement of the engagement part to the interior side component. Accordingly, the interior side component is able to be smoothly detached from the vehicle body side component. Accordingly, the installation structure according to the embodiments of the invention can be released and expanded smoothly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An installation structure, comprising:
an air bag, disposed on an indoor side of a vehicle body;
an interior, covering the air bag; and
a fastener, connected with the interior and installed to the vehicle body,
wherein the fastener comprises a vehicle body side component installed to the vehicle body and an interior side component installed to the interior,
one of the vehicle body side component and the interior side component is provided with a male part, and an other of the vehicle body side component and the interior side component is provided with a female part engaged with the male part,
the female part comprises:
a first wall, extending in an insertion direction in which the fastener is inserted into the vehicle body;
a second wall, parallel to the first wall; and
an engagement part, provided on the first wall and engaged with the male part,
wherein, in a state in which the male part is engaged with the female part, a space part is formed at a position adjacent to the male part and between the first wall and the second wall,
wherein a first direction is defined as a direction in which the first wall and the second wall face each other,
the first wall comprises a pressing part, and the pressing part presses against the interior side component in a second direction perpendicular to the first direction,
the pressing part comprises a first inclined part, and the first inclined part is inclined in a direction toward an outer side of the second direction and away from the interior side component,
the male part comprises an engaged part to be engaged with the engagement part of the female part, and
the engagement part comprises an inclined part, the inclined part is inclined in a direction toward an outer side of a second direction perpendicular to the first direction and away from the engagement part.
2. The installation structure as claimed in claim 1, wherein an upper part of the second wall is pressed against the one of the vehicle body side component and the interior side component where the male part is provided,
the upper part of the second wall comprises a second inclined part, the second inclined part is inclined in a direction toward an outer side of a second direction perpendicular to the first direction and away from the one of the vehicle body side component and the interior side component where the male part is provided.
3. The installation structure as claimed in claim 1, further comprising:
a strap, connected with the vehicle body or the vehicle body side component and the interior or the interior side component,
wherein the strap is connected with the second wall.

* * * * *